US012674567B2

(12) United States Patent
Van Bommel et al.

(10) Patent No.: US 12,674,567 B2
(45) Date of Patent: Jul. 7, 2026

(54) TRACK LIGHTING SYSTEM COMPRISING A LIGHTING TRACK TO WHICH FIXTURES MAY BE CONNECTED FOR PROVIDING LIGHT AS WELL AS A CORRESPONDING LIGHTING FIXTURE

(71) Applicant: SIGNIFY HOLDING B.V., Eindhoven (NL)

(72) Inventors: Ties Van Bommel, Horst (NL); Karnekumar Arulandu, Breda (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/997,527

(22) PCT Filed: Jul. 17, 2023

(86) PCT No.: PCT/EP2023/069749
§ 371 (c)(1),
(2) Date: Jan. 22, 2025

(87) PCT Pub. No.: WO2024/022858
PCT Pub. Date: Feb. 1, 2024

(65) Prior Publication Data

US 2026/0022826 A1 Jan. 22, 2026

(30) Foreign Application Priority Data

Jul. 26, 2022 (EP) .................................... 22186885

(51) Int. Cl.

*F21V 23/02* (2006.01)
*F21S 8/06* (2006.01)
(Continued)

(52) U.S. Cl.
CPC .............. *F21V 23/02* (2013.01); *F21S 8/066* (2013.01); *F21V 21/34* (2013.01); *F21V 21/35* (2013.01);
(Continued)

(58) Field of Classification Search
CPC ........ F21S 8/066; F21V 21/34; F21V 21/005; H05B 47/14; H05B 45/37
See application file for complete search history.

(56) References Cited

U.S. PATENT DOCUMENTS 4,688,154 A 8/1987 Nilssen
6,300,725 B1 10/2001 Zinkler et al.
(Continued)

FOREIGN PATENT DOCUMENTS

CN 212204115 U 12/2020
EP 3327343 A2 * 5/2018 ............ F21V 23/023
(Continued)

*Primary Examiner* — William N Harris

(57) ABSTRACT

A track lighting system, comprising a power supply connectable to an Alternating Current, AC, mains voltage, said power supply being arranged for converting said AC mains voltage into a safety voltage being lower than said AC mains voltage; a lighting track electrically connectable to said power supply and arranged for receiving lighting fixtures and for distributing said safety voltage to received lighting fixtures; a lighting fixture, comprising an adapter for mechanically and electrically connecting said lighting fixture to said lighting track; a lamp socket arranged for receiving an AC mains powered lamp; an upconverter arranged for upconverting said safety voltage, received from said lighting track, into an upconverted voltage being higher than said safety voltage, for providing said upconverted voltage to electrical contacts in said lamp socket.

12 Claims, 3 Drawing Sheets

(51) Int. Cl.

| | |
|---|---|
| ***F21V 21/34*** | (2006.01) |
| ***F21V 21/35*** | (2006.01) |
| ***F21Y 115/10*** | (2016.01) |
| ***H05B 45/37*** | (2020.01) |
| ***H05B 47/00*** | (2020.01) |

(52) U.S. Cl.
CPC ............. *H05B 45/37* (2020.01); *H05B 47/00* (2020.01); *F21Y 2115/10* (2016.08)

(56) References Cited

U.S. PATENT DOCUMENTS

| | | | | |
|---|---|---|---|---|
| 2007/0167043 | A1 | 7/2007 | Lehman et al. | |
| 2015/0189712 | A1 | 7/2015 | Van Endert | |
| 2015/0229127 | A1 | 8/2015 | Wendt et al. | |
| 2018/0128464 | A1* | 5/2018 | Sonneman | F21S 8/061 |
| 2019/0104583 | A1* | 4/2019 | Konishi | H05B 45/385 |
| 2022/0400544 | A1* | 12/2022 | Janik | H05B 47/185 |
| 2024/0377048 | A1* | 11/2024 | Reilly | F21S 4/28 |

FOREIGN PATENT DOCUMENTS

| | | | |
|---|---|---|---|
| JP | 2015191815 | A | 11/2015 |
| JP | 2019068614 | A | 4/2019 |
| WO | 2008065383 | A1 | 6/2008 |

* cited by examiner

TRACK LIGHTING SYSTEM COMPRISING A LIGHTING TRACK TO WHICH FIXTURES MAY BE CONNECTED FOR PROVIDING LIGHT AS WELL AS A CORRESPONDING LIGHTING FIXTURE

CROSS-REFERENCE TO PRIOR APPLICATIONS

This application is the U.S. National Phase application under 35 U.S.C. § 371 of International Application No. PCT/EP2023/069749, filed on Jul. 17, 2023, which claims the benefit of European Patent application Ser. No. 22/186,885.4, filed on Jul. 26, 2022. These applications are hereby incorporated by reference herein.

TECHNICAL FIELD

The present disclosure is generally related to the field of lighting and, more specifically, to a track lighting system having a lighting track to which lighting fixtures may be connected.

BACKGROUND

A track lighting system may be considered as a versatile, flexible option for lighting the environment such as your home. A track lighting system has been around ever since the 80s. People ought to think that a track lighting system was, for the most part, a practical way of providing lighting instead of actually aesthetically beautiful. However, due to its flexibility and simplicity, track lighting is experiencing some sort of come back the last couple of years.

Typically, a track lighting system comprises a couple of components. First, a power supply is provided for converting an AC mains supply voltage to a safety voltage. The safety voltage is a low voltage that is considered unharmful. The safety voltage is provided to a lighting track. The lighting track may be mounted on a ceiling, wall, or anything alike. The lighting track may provide a couple of functions. First, the lighting track may be arranged to receive one or more lighting fixtures. Second, the lighting track may distribute the safety voltage to the received lighting fixtures. A lighting fixture may be connected to the lighting track at any desired location thereof, such that the lighting fixture is firmly connected to the lighting track and such that the lighting fixture will connect a lamp, that is received in the lighting fixture, to the safety voltage that is distributed by the lighting track.

Finally, a particular lamp is provided in the lighting fixture for providing the light.

One of the downsides of the above described lighting track is that they might not be sufficiently versatile or flexible such that they can cope with different types of lamps.

SUMMARY

It is an object of the present disclosure to provide for a track lighting system that is more versatile or flexible such that it is able to cope with different types of lamps. It is a further object of the present disclosure to provide for a lighting fixture connectable to a lighting track comprised by the lighting system.

In a first aspect of the present disclosure, there is provided a track lighting system, comprising:

- a power supply connectable to an Alternating Current, AC, mains voltage, said power supply being arranged for converting said AC mains voltage into a safety voltage being lower than AC mains voltage;
- a lighting track electrically connectable to said power supply and arranged for receiving lighting fixtures and for distributing said safety voltage to received lighting fixtures;
- a lighting fixture, comprising:
  - an adapter for mechanically and electrically connecting said lighting fixture to said lighting track;
  - a lamp socket arranged for receiving an AC mains powered lamp;
  - an upconverter arranged for upconverting said safety voltage, received from said lighting track, into an upconverted voltage being higher than said safety voltage, for providing said upconverted voltage to electrical contacts in said lamp socket.

The inventors have found that it may be beneficial to adapt a known track lighting system in such a way that it is also able to cope with AC mains powered lamps. This makes the track lighting system more versatile or flexible.

A solution is brought forward in which the voltage that is distributed by the lighting track may not need to be changed. The power supply may continue to provide for a safety voltage, such that there are no safety concerns present in relation with the track lighting system.

The underlying concept of the present disclosure is that an upconverter is comprised by the lighting fixture, which upconverter is arranged for upconverting the safety voltage that is received from the lighting track, into an upconverted voltage that is suitable for powering an AC mains powered lamp.

The upconverter does not, necessarily, need to upconvert the safety voltage to exactly the same AC mains voltage, but may need to upconvert the safety voltage to such a voltage level that the AC mains powered lamp is able to work properly.

As such, a user may simply mount an AC mains powered lamp into the lamp socket and may be assured that the AC mains powered lamp will be operated adequately.

The safety voltage that is provided by the power supply may be considered a Separated Extra Low Voltage, SELV, which is an extra low voltage electrical circuit that is electrically separated from other circuits that carry higher voltages, isolated from earth and from the protective earth conductors of other circuits.

In an SELV system, the voltage should not exceed the extra low voltage under the normal conditions or under single-fault conditions such as those from earth faults in other circuits. An SELV system is separated from the earth such that a single fault cannot cause an electrical shock to anyone in contact with the system. This makes the system extra safe.

One of the benefits of the presented track lighting system is that an AC mains powered lamp may be powered by a track lighting system, in which the corresponding lighting track distributes a voltage that is considered to be safe. The high voltage part of the system is provided in the lighting fixture, i.e. by the upconverter, which may be designed to provide additional, for example mechanical, safety to a user.

It is noted that the track lighting system may be arranged for providing system light. The system light may comprise multiple lighting fixtures, either the same or different to one another. The lighting fixtures may be arranged to provide a particular amount of light, a particular colour of light, etc. Due to the properties of the track lighting system, the lighting fixtures may be connected at any desired location of the lighting track, such that a user is able to provide lighting at a desired location.

In accordance with the present disclosure, the lighting track may have an elongated shape. For example, the lighting track may have a length L which is at least 20 times the span of the width of the lighting track. The length of the lighting track may be at least 2 meter, for example. The width of the lighting track may be standardized, or may be any of 1 to 10 cm, for example.

In an example, the power supply is arranged to convert said AC mains voltage into a Direct Current, DC, safety voltage.

Multiple options for the power supply may be feasible. First, the power supply may convert the AC mains voltage into a DC safety voltage, and the DC safety voltage may be distributed to the different lighting fixtures that are connected to the lighting track.

The upconverter that is comprised by the lighting fixture may then be arranged to upconvert the DC safety voltage into either a DC upconverted voltage or an AC upconverted voltage.

The inventors have realized that it might not be necessary to construe the exact same voltage at the output of the upconverter as the voltage that is being received from the mains supply.

The above is especially the case when a Light Emitting Diode, LED, based lamp is connected to the socket. An LED based lamp typically comprises a converter for converting the AC main supply voltage to a DC voltage, given that the LEDs of the LED based lamp operate on DC. Such a converter may, for example, be a diode bridge or anything alike. A diode bridge is an arrangement of four diodes in a bridge circuit configuration that provides the same polarity of output for either polarity of input. It was one of the insights of the inventors that such converters may also operate adequately when provided with a DC voltage. The converter comprised by the LED based lamp, i.e. the diode bridge, may then become superfluous but that does not affect the correct functioning of the LED based lamp.

One of the advantages of the above is that the upconverter, that is comprised by the lighting fixture, may be implemented in such a way that it outputs a DC voltage. Typically, an upconverter that provides for a DC voltage is easier to implement compared to an upconverter that provides for an AC voltage.

In another example, the power supply is arranged to convert said AC mains voltage into an AC safety voltage.

The inventors have found that it might be beneficial if the voltage that is distributed by the lighting track is an AC voltage. This may be accomplished by utilizing an efficient AC to AC converter for converting the AC mains supply voltage to the AC safety voltage. Typically, a transformer is used in such a design to provide for the conversion and to provide for the galvanic isolation that is required from a safety perspective.

It is noted that the upconverter may be arranged to upconvert the AC safety voltage into an AC upconverted voltage or a DC upconverted voltage.

In another example, the lamp socket has received said AC mains powered lamp, wherein said AC mains powered lamp is a Light Emitting Diode, LED, lamp, wherein said LED lamp comprises an AC-DC converter, and may further comprise a cap, an envelope and an LED light source; wherein said cap is configured to electrically and mechanically connect said LED lamp to said lamp socket, wherein said envelope is at least partly enclosing said LED light source; and wherein said LED light source may be an LED filament.

The envelope may be translucent or may have an opening such that the generated light may exit the AC mains powered lamp.

As mentioned above, the AC-DC converter may be a rectifier like a diode bridge or anything alike. Although the LED lamp may comprise an AC-DC converter, it does not necessarily mean that the voltage provided to the LED lamp is an AC voltage. The upconverted voltage may still be a DC voltage, as the AC-DC converter may also function properly when provided with a DC voltage at its input.

In a further example, the power supply is arranged to convert said AC mains voltage, being any of 120V and 230V, to said safety voltage, and wherein said upconverter is arranged for upconverting said safety voltage into said upconverted voltage, being any of 120V and 230V.

In this particular example, the upconverted voltage may equal the AC mains voltage. This is, in accordance with the present disclosure, however not essential. The upconverted voltage may also be a lower voltage compared to the AC mains voltage, as the AC-DC converter comprised by the LED lamp may also be able to cope with such a lower voltage. The upconverted voltage may, for example, be any of 150 Vdc or 200 Vac or anything alike.

In a further example, the power supply is arranged to convert said AC mains voltage to said safety voltage being any of 24V or 48 V.

There are different standards publicly available that have their own definition for a safety voltage. For example, a voltage may be considered safe if it does not exceed 48 Vdc or 24 Vac.

In Yet Another Example, the Lighting Fixture Further Comprises:

- a detection mechanism for detecting a type of AC mains powered Light Emitting Diode, LED, lamp received in said lamp socket and being arranged for adjusting said upconverted voltage to said type of mains powered LED lamp received in said lamp socket.

The detection mechanism may, for example, detect the current that is flowing to the LED lamp and may adjust the upconverter accordingly. In another example, the detection mechanism may detect the inrush current, or the inrush voltage of the mains powered LED lamp, and may correlate the inrush current or voltage to known inrush currents or voltages accordingly.

In another example, the detection mechanism is arranged for detecting a type of mains powered LED lamp received in said lamp socket by detect any of:

- detecting a tapped linear power converter comprised by said mains powered LED lamp;
- detecting a Switched Mode Power Supply, SMPS, comprised by said mains powered LED lamp;
- detecting a linear type of power converter comprised by said mains powered LED lamp.

If the detection mechanism detects a low voltage powered lamp in the lamp socket, it may simply assure that the upconverter gets bypassed such that the safety voltage itself is provided to the low voltage powered lamp.

In an even further example, the track lighting system further comprises:

- a further lighting fixture, comprising:
  - a further adapter for mechanically and electrically connecting said further lighting fixture to said lighting track;

a low voltage lamp socket arranged for receiving a low voltage powered LED lamp.

The track lighting system may comprise a plurality of those further lighting fixtures, wherein each of said plurality of further lighting fixtures are intended to be connected to the lighting track.

The further lighting fixtures, or the lighting fixtures, may provide a spotlight, a downlight, omnidirectional light or anything alike.

The track lighting system may be used for lighting fixtures that are arranged for receiving an AC mains powered lamp but may also be used for lighting fixtures that are arranged for receiving a low voltage powered LED lamp. The low voltage powered LED lamp may be provided by the safety voltage that is distributed by the lighting track.

The upconverter may be comprised in the adapter or may be comprised in the lamp socket.

In a second aspect of the present disclosure, there is provided a lighting fixture, comprising:

an adapter for mechanically and electrically connecting said lighting fixture to a lighting track of a track lighting system in accordance with any of the previous claims;

a lamp socket arranged for receiving an AC mains powered lamp;

an upconverter arranged for upconverting said safety voltage, received from said lighting track, into an upconverted voltage being higher than said safety voltage, for providing said upconverted voltage to electrical contacts in said lamp socket.

It is noted that the advantages as explained with respect to the first aspect of the present disclosure being the track lighting system also apply, mutatis mutandis, to the second aspect of the present disclosure, being the lighting fixture.

In an example, the lamp socket has received a mains powered LED filament lamp.

The above and other aspects of the disclosure will be apparent from and elucidated with reference to the example described hereinafter.

DETAILED DESCRIPTION

Figure 1:
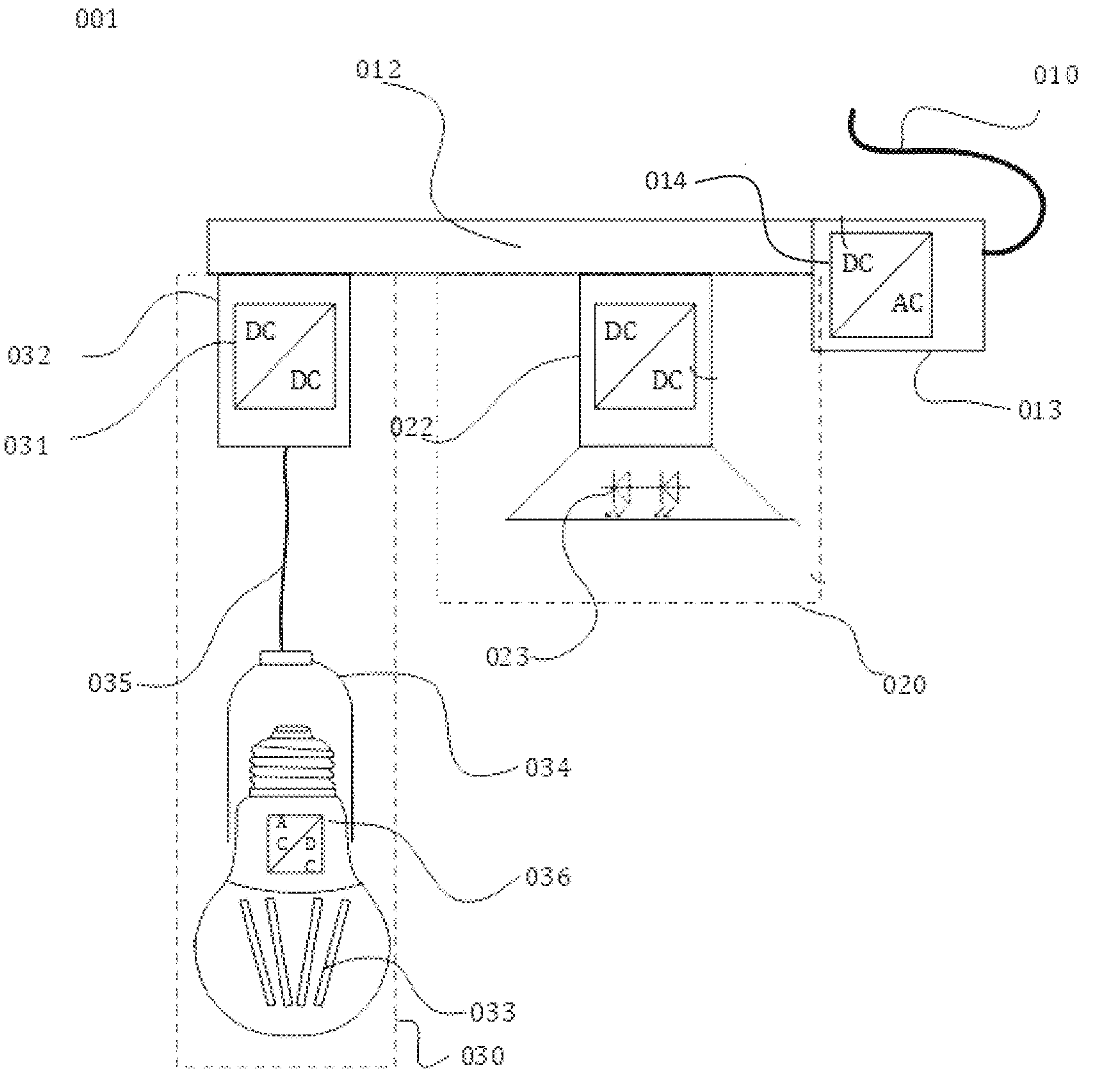
FIG. 1 discloses a track lighting system in accordance with the present disclosure.

It is noted that in the description of the figures, same reference numerals refer to the same or similar components performing a same or essentially similar function.

FIG. 1 discloses a track lighting system in accordance with the present disclosure.

Track lighting may be considered as a type of lighting fixture that has individual lights along a lighting track, also called a bar or rail. The lights, known as track heads, track lighting fixtures or lighting fixtures, slide or connect along the track. In some cases, the lighting fixtured may be adjusted to fit the angle and position that is desired.

The track lighting system 001 comprises a power supply 013 that is connectable to an Alternating Current, AC, mains voltage 010. The AC mains voltage 010 is, for example, a 230 Vac mains voltage or a 110 Vac mains voltage. The power supply 013 is arranged for converting said AC mains voltage 010 into a safety voltage 014 being lower than said AC mains voltage 010.

The power supply 013 may comprise any form of converter for realizing the safety voltage. In an example, the power supply 013 comprises a flyback converter. A flyback converter may be used to convert the AC mains voltage 010 into a safety DC voltage with galvanic isolation between the input and any outputs. The galvanic isolation provides for additional safety measures such that the safety DC voltage may be considered a safe voltage.

The flyback converter is typically viewed as a buck-boost converter with the inductor split to form a transformer, so that the voltage ratios are multiplied with an additional advantage of isolation.

Further, the track lighting system 001 comprises a lighting track 012 which is electrically connectable to the power supply 010 and is arranged for receiving lighting fixtures 030, 020 and for distributing the safety voltage to any received lighting fixtures.

The lighting track 012 is visually depicted as a rectangle. A skilled person will understand that the lighting track 012 may have mechanical properties for easily connecting a lighting fixture thereto. The lighting track 012 may, for example, comprise H, J and L shaped tracks.

The lighting track 012 may be construed using a metal like aluminum. The lighting track 012 may also be construed using any other material, for example a material that can be curved or the like. The advantage of the latter is that the lighting track 012 may be construed in any form or track that is desired. Alternatively, the track may be composed of two wires, where one wire receives the power form the power supply 013 and another wire serves as a return path back to the power supply 013. The lighting fixtures 030, 020 may then be mechanically and electrically connected to these two wires.

On top of the mechanical properties as disclosed above, the lighting track 012 is equipped with electrical conductors for distributing the received safety voltage to any received, or connected, lighting fixtures. The lighting track is electrically connectable to the power supply 010 meaning that the output of the power supply 010 is electrically connected to the electrical conductors of the lighting track for distributing the safety voltage that is provided by the power supply 010.

The track lighting system 001 further comprises at least one lighting fixture 030 comprising an adapter 032, a lamp socket 034 and an upconverter 031.

The adapter 032 is used for mechanically and electrically connecting the lighting fixture 030 to the lighting track 012. The adapter 032 is thus used for, amongst other, making sure that the distributed safety voltage is received by the lighting fixture 030.

A lamp socket 034 is provided for receiving an AC mains powered lamp. The lamp socket 034 may, for example, be any of the type of E27, B22, E14, GU10.

In this particular case, an LED based filament lamp 030 is received in the lamp socket 034. The filaments are indicated with reference numeral 033. The LED based filament lamp 030 comprises a converter, more specifically an AC to DC converter 036, for converting the received upconverted voltage to a DC voltage for providing to the LED filaments 033. The lamp socket 034 may be connected to the adapter 032 via a wire as indicated with reference numeral 035.

Finally, the lighting fixture 030 comprises an upconverter 031 for upconverting said safety voltage, received from said lighting track 012, into an upconverted voltage being higher than said safety voltage, for providing said upconverted voltage to electrical contacts 037 in said lamp socket 034.

The upconverter 031 may comprise a DC-to-DC, a DC-to-AC, an AC-to-DC or an AC-to-AC converter. In this particular scenario, the upconverter 031 comprises a DC-to-DC converter as indicated with reference numeral 031. The DC-to-DC converter 031 is, for example, a boost converter for boosting the DC safety voltage to a higher voltage, for example higher than 150 Vdc.

As mentioned above, one of the advantages of the track lighting system 001 in accordance with the present disclosure is that the distributed voltage, i.e. the voltage that is distributed by the lighting track 012, is a relatively low, safety voltage while it is still possible to connect a mains powered lamp 030 to the track lighting due to the presence of the upconverter 031.

For example, a halogen transformer in the form of a self-oscillating Switched Mode Power Supply, SMPS, may be used as a power supply 013. Such an SMPS may convert the incoming AC mains supply voltage, i.e. 230 Vac, to a safety voltage in the form of 120 Vac. The 120 Vac may be, for example, in the range of 40 kHz-120 kHz. The main advantage of using such an SMPS is that the upconverter may be realized using only passive components to transform the incoming 120 Vac to, for example, 230 Vac. This allows the upconverter to be very compact such that it fits into the socket 034.

The track lighting system 001 shown in FIG. 1 further comprises a further lighting fixture as indicated with reference numeral 020. This further lighting fixture 020 comprises a further adapter 022 for mechanically and electrically connecting the further lighting fixture 020 to the lighting track 012. A low voltage lamp socket is implemented in the further adapter 022 and is arranged for receiving a low voltage powered LED lamp 023.

Figure 2:
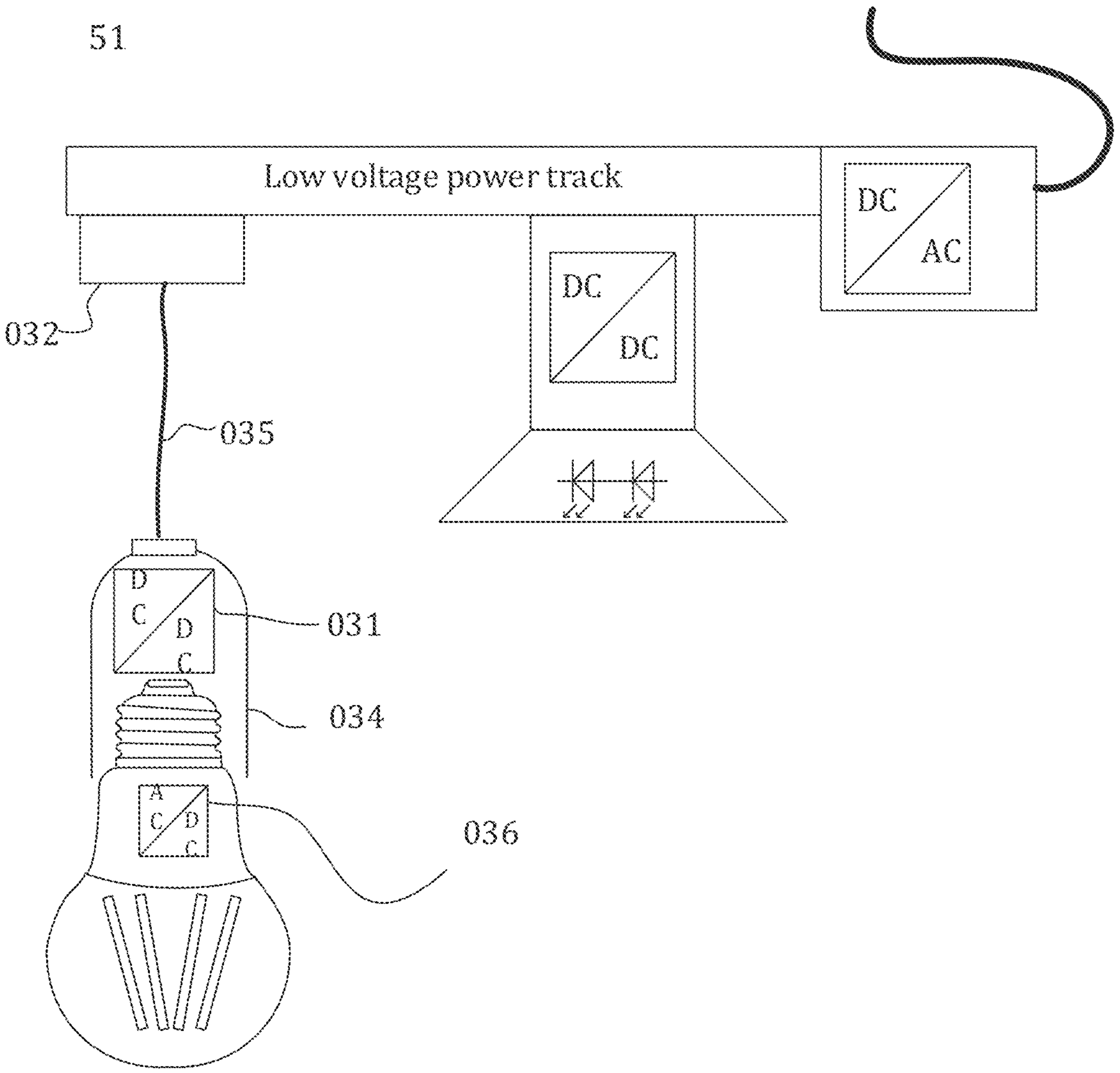
FIG. 2 discloses another track lighting system in accordance with the present disclosure.

FIG. 2 discloses another track lighting system 51 in accordance with the present disclosure.

The track lighting system 51 shown in FIG. 2 is, essentially, the same as the track lighting system 001 shown in FIG. 1. The differences between the two track lighting systems 51, 001 are highlighted here below.

The difference between the track lighting system 51 shown in FIG. 2 and the track lighting system 001 shown in FIG. 1 is related to the upconverter 031. The upconverter is, in FIG. 2, embodied in the lamp socket 034 instead of in the adapter 032.

Figure 3:
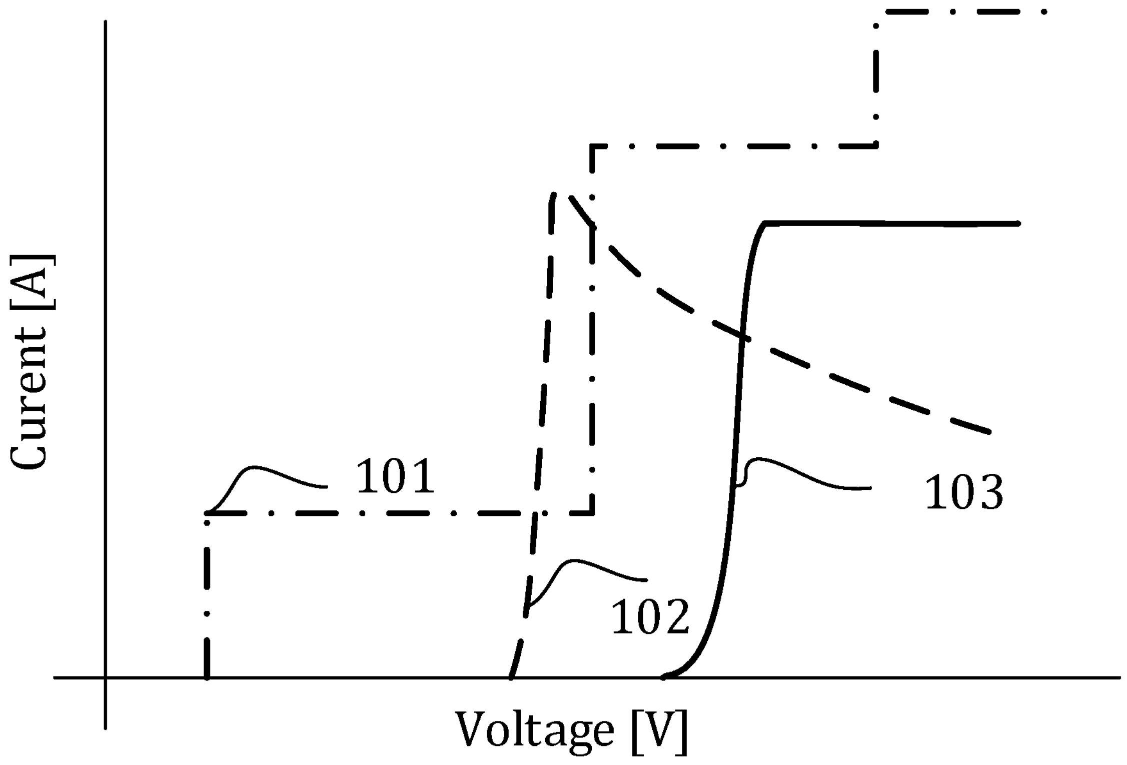
FIG. 3 discloses multiple voltage-current characteristics of Light Emitting Diode, LED, based lamps.

FIG. 3 discloses multiple voltage-current characteristics of Light Emitting Diode, LED, based lamps.

A lighting fixture may comprise a so-called detection mechanism for detecting a particular type of AC mains powered LED lamp received in the lamp socket, and the detection mechanism may be arranged for control the upconverter in such a way that it adjusts to the detected type of mains powered LED lamp received in the corresponding lamp socket.

FIG. 3 discloses particular Voltage-Current characteristics of particular LED filament lamps and, more specifically, the Voltage-Current characteristics of a converter comprised by those LED filament lamps.

The current waveform as indicated with reference numeral 101 shows a typical curve of a tapped linear power converter. The current waveform as indicated with reference numeral 102 shows a typical curve of a Switched Mode Power Supply, SMPS. The current waveform as indicated with reference numeral 103 shows a typical curve of a linear type of power converter.

The upconverter that is comprised by the lighting fixture may utilize the information above to control its output voltage such it is better matches the detected Voltage-Current characteristic.

Other variations to the disclosed embodiments can be understood and effected by those skilled in the art in practicing the claimed invention, from a study of the drawings, the disclosure and the appended claims. In the claims, the word “comprising” does not exclude other elements or steps, and the indefinite article “a” or “an” does not exclude a plurality. The mere fact that certain measures are recited in mutually different dependent claims does not indicate that a combination of these measures cannot be used to advantage. Any reference signs in the claims should not be construed as limiting the scope thereof.

The invention claimed is:

1. A track lighting system, comprising:

a power supply connectable to an Alternating Current, AC, mains voltage, said power supply being arranged for converting said AC mains voltage into a safety voltage being lower than said AC mains voltage;

a lighting track electrically connectable to said power supply and arranged for receiving lighting fixtures and for distributing said safety voltage to received lighting fixtures;

at least one of said lighting fixtures, comprising:

an adapter for mechanically and electrically connecting the at least one of said lighting fixtures to said lighting track;

a lamp socket arranged for receiving an AC mains powered lamp; and an upconverter arranged for upconverting said safety voltage, received from said lighting track, into an upconverted voltage being higher than said safety voltage, for providing said upconverted voltage to electrical contacts in said lamp socket.

2. A track lighting system according to claim 1, wherein said power supply is arranged to convert said AC mains voltage into a Direct Current, DC, safety voltage.

3. A track lighting system according to claim 2, wherein said upconverter is arranged for any of:

upconverting said DC safety voltage into a DC upconverted voltage; or upconverting said DC safety voltage into an AC upconverted voltage.

4. A track lighting system according to claim 1, wherein said power supply is arranged to convert said AC mains voltage into an AC safety voltage.

5. A track lighting system according to claim 4, wherein said upconverter is arranged for any of:

upconverting said AC safety voltage into an AC upconverted voltage; or upconverting said AC safety voltage into a DC upconverted voltage.

6. A track lighting system in accordance with claim 1, comprising said AC mains powered lamp, wherein said AC mains powered lamp is a Light Emitting Diode, LED, lamp, wherein said LED lamp comprises an AC-DC converter, a cap, an envelope and an LED light source; wherein said cap is configured to electrically and mechanically connect said LED lamp to said lamp socket, wherein said envelope is at least partly enclosing said LED light source; and wherein said LED light source is an LED filament.

7. A track lighting system according to claim 1, wherein said power supply is arranged to convert said AC mains voltage, being any of 120V or 230V, to said safety voltage, and wherein said upconverter is arranged for upconverting said safety voltage into said upconverted voltage, being any of 120V or 230V.

8. A track lighting system according to claim 1, wherein said power supply is arranged to convert said AC mains voltage to said safety voltage being any of 24V or 48V.

9. A track lighting system in accordance with claim 1, wherein said track lighting system further comprises:

a further lighting fixture, comprising:

a further adapter for mechanically and electrically connecting said further lighting fixture to said lighting track; and a low voltage lamp socket arranged for receiving a low voltage powered LED lamp.

10. A track lighting system in accordance with claim 1, wherein said upconverter is comprised in at least one of said adapter or said lamp socket.

11. A lighting fixture, comprising:

an adapter for mechanically and electrically connecting said lighting fixture to a lighting track of the track lighting system in accordance with claim 1;

a lamp socket arranged for receiving an AC mains powered lamp; and an upconverter arranged for upconverting said safety voltage, received from said lighting track, into an upconverted voltage being higher than said safety voltage, for providing said upconverted voltage to electrical contacts in said lamp socket.

12. A lighting fixture in accordance with claim 11, comprising a mains powered LED filament lamp.

* * * * *